United States Patent
Kang et al.

(10) Patent No.: US 10,418,865 B2
(45) Date of Patent: *Sep. 17, 2019

(54) STATOR SEAT OF MOTOR, AND CONNECTOR WATERPROOF STRUCTURE THEREOF

(71) Applicant: DELTA ELECTRONICS, INC., Taoyuan County (TW)

(72) Inventors: Chao-Hsing Kang, Taoyuan County (TW); Chien-Ho Lee, Taoyuan County (TW); Tsung-Yin Lee, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,708

(22) Filed: Aug. 6, 2018

(65) Prior Publication Data

US 2018/0351418 A1     Dec. 6, 2018

Related U.S. Application Data

(63) Continuation of application No. 14/719,856, filed on May 22, 2015, now Pat. No. 10,069,352.
(Continued)

(51) Int. Cl.
*H02K 11/00* (2016.01)
*H02K 1/16* (2006.01)
(Continued)

(52) U.S. Cl.
CPC .............. *H02K 1/16* (2013.01); *F04D 17/08* (2013.01); *F04D 19/002* (2013.01);
(Continued)

(58) Field of Classification Search
CPC ......... H02K 1/16; F04D 17/08; F04D 19/002; F04D 25/0613; F04D 29/053; F04D 29/281; F04D 29/325; F04D 29/329
(Continued)

(56) References Cited

U.S. PATENT DOCUMENTS 6,879,071 B2 * 4/2005 Kanazawa ............. H02K 1/185
310/71
8,704,418 B2 * 4/2014 Rojo Lulic .......... H02K 1/2786
310/67 R
2014/0028161 A1 * 1/2014 Kamogi ............... H01R 12/523
310/68 D

FOREIGN PATENT DOCUMENTS

CN     202585920     12/2012
CN     202931079     5/2013

OTHER PUBLICATIONS

Office Action dated Feb. 28, 2017 from corresponding application No. CN 201510217539.7.

* cited by examiner

*Primary Examiner* — Jianchun Qin
(74) *Attorney, Agent, or Firm* — Hauptman Ham, LLP

(57) ABSTRACT

A stator seat of a motor includes a pillow, a connector, a waterproof element and cables. A sleeve is extended from the pillow. A cap covers the pillow and sleeve. A control chamber is formed and enclosed by the cap and pillow. The pillow has a through hole communicated with the control chamber. The connector corresponsive to the through hole is installed in the control chamber and includes a first connecting structure. The waterproof element covers the through hole and includes an annular groove and an O-ring clamped between the waterproof element and pillow, and a second connecting structure. The first and second connecting structures are passed through the through hole. An
(Continued)

insertion hole is penetrated through the waterproof element. Each of the cables has an end connected to the connector and the other end passed out from the pillow through the insertion hole and through hole.

19 Claims, 9 Drawing Sheets

Related U.S. Application Data

(60) Provisional application No. 62/001,898, filed on May 22, 2014.

(51) Int. Cl.
| | | |
|---|---|---|
| *F04D 17/08* | (2006.01) | |
| *F04D 19/00* | (2006.01) | |
| *F04D 29/053* | (2006.01) | |
| *F04D 29/28* | (2006.01) | |
| *F04D 29/32* | (2006.01) | |
| *H02K 1/27* | (2006.01) | |
| *H02K 1/30* | (2006.01) | |
| *H02K 5/10* | (2006.01) | |
| *H02K 5/22* | (2006.01) | |
| *H02K 7/14* | (2006.01) | |
| *F04D 25/06* | (2006.01) | |
| *F04D 29/64* | (2006.01) | |
| *H02K 9/06* | (2006.01) | |

(52) U.S. Cl.
CPC ....... *F04D 25/0613* (2013.01); *F04D 29/053* (2013.01); *F04D 29/281* (2013.01); *F04D 29/325* (2013.01); *F04D 29/329* (2013.01); *F04D 29/646* (2013.01); *H02K 1/2786* (2013.01); *H02K 1/30* (2013.01); *H02K 5/10* (2013.01); *H02K 5/225* (2013.01); *H02K 7/14* (2013.01); *H02K 9/06* (2013.01)

(58) Field of Classification Search
USPC .......................................................... 310/71
See application file for complete search history.

US 10,418,865 B2

STATOR SEAT OF MOTOR, AND CONNECTOR WATERPROOF STRUCTURE THEREOF

CROSS-REFERENCE TO RELATED APPLICATION

This patent application is a continuation application of U.S. application Ser. No. 14/719,856 filed on May 22, 2015, which claims the benefit of United States Provisional Patent Application No. 62/001,898, filed May 22, 2014. The entire disclosure is incorporated herein by reference.

FIELD OF THE INVENTION

The present invention generally relates to motors, and more particularly to a stator seat of a motor and its connector waterproof structure.

BACKGROUND OF THE INVENTION

The present invention discloses a fan motor applied to a large fan, and the fan motor generally comprises a stator seat, a stator and a rotor. The stator is mounted onto the stator seat, and the rotor is pivotally installed to the stator seat, and the stator includes pole teeth wound around the coil, and the rotor includes magnetic poles, such that the electrically conducted coil and the magnetic poles generate electromagnetic induction to rotate the rotor.

In general, a control chamber is formed in the stator seat, and a control module is installed in the control chamber and electrically coupled to the coil for supplying power to the coil to control the operation of the rotor. The control module is electrically coupled to the coil by passing the cable out from the control chamber. When such motor is used outdoor, a good waterproof design is required at the position wherein the cable is passed in order to assure that the moisture in the external environment will not enter into the control chamber.

In view of the problems of the prior art, the inventor of the present invention invented a waterproof structure in accordance with the present invention to overcome the problems of the prior art.

SUMMARY OF THE INVENTION

Therefore, it is a primary objective of the present invention to provide a waterproof stator seat of a motor and its connector waterproof structure.

To achieve the aforementioned and other objectives, the present invention provides a stator seat of a motor comprising a pillow, a connector, a waterproof element and a plurality of cables. A sleeve is extended from an external surface of the pillow, and a cap is covered onto the pillow and an opposite side of the sleeve. A control chamber is formed by being enclosed by the cap and the pillow, and the pillow has a through hole formed thereon and communicated with the control chamber. The connector is configured to be corresponsive to the through hole and installed in the control chamber. The connector includes a first connecting structure. The waterproof element is covered onto the external side of the through hole, and an annular groove is formed on a side of the waterproof element. An O-ring is installed in the annular groove and clamped between the waterproof element and the external surface of the pillow. The waterproof element includes a second connecting structure, wherein the first and second connecting structures are connected to each other through the through hole, and an insertion hole is formed and penetrated through the waterproof element. Each cable has an end connected to the connector and the other end passed out from the pillow through the insertion hole and the through hole.

The present invention further provides a connector waterproof structure comprising a pillow, a connector, a waterproof element and a plurality of cables. A sleeve is extended from a side of the pillow, and a through hole is formed on a side of the sleeve and communicated with the opposite side of the sleeve. The connector is installed on the pillow and corresponsive to the through hole and disposed on the opposite side of the pillow. The connector includes a first connecting structure. The waterproof element is configured to be corresponsive to the through hole and installed at the pillow, wherein the waterproof element and the sleeve are installed on the same side, and an annular groove is formed on a side of the waterproof element, and an O-ring is formed in the annular groove and clamped between the waterproof element and the pillow. The waterproof element includes a second connecting structure, and the first and second connecting structures are passed through the through hole and connected to each other. An insertion hole is formed on the waterproof element and penetrated through the waterproof element. Each of the cables has an end connected to the connector and the other end passed through the insertion hole and the through hole.

In the stator seat of the motor and its connector waterproof structure of the present invention, the waterproof element is provided to achieve the waterproof effect between the connector and the through hole formed on the stator seat, so as to block and prevent moisture from entering into the control chamber of the stator seat.

DESCRIPTION OF THE PREFERRED EMBODIMENTS

Figure 1:
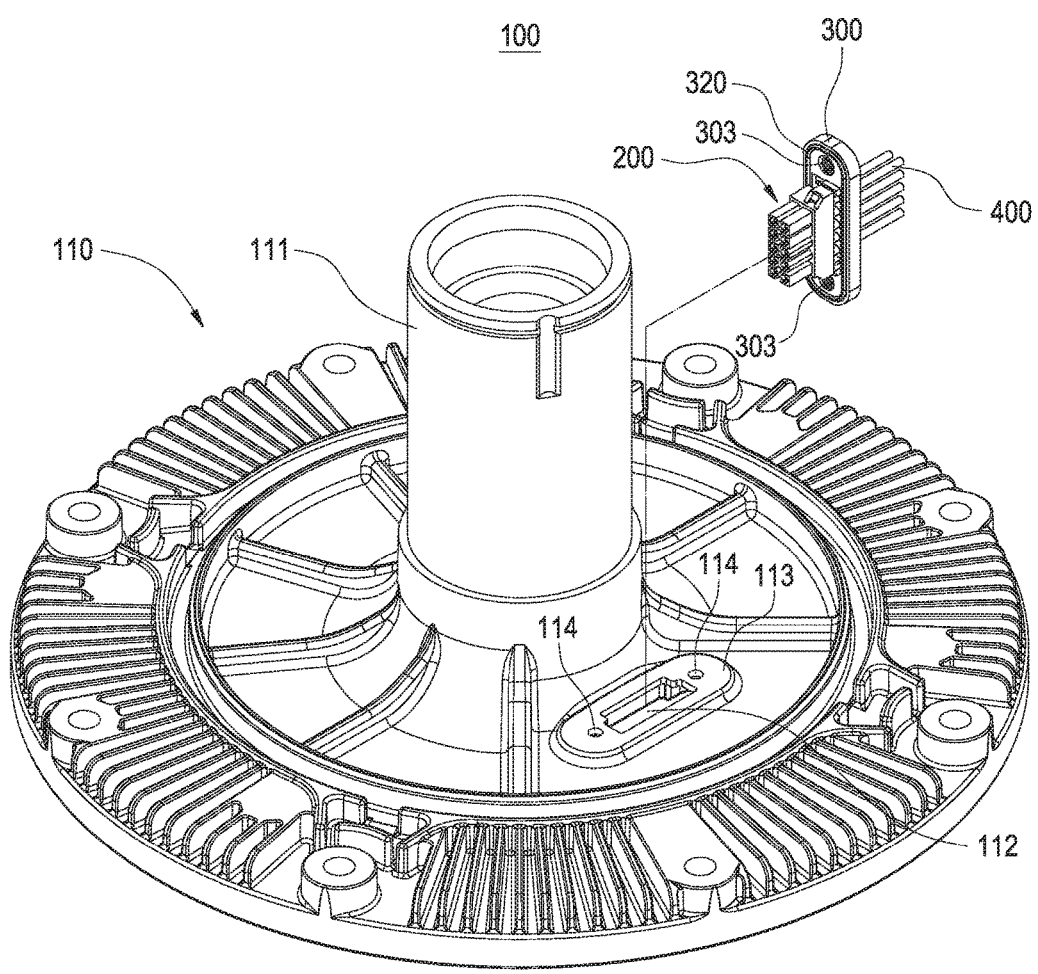
FIG. 1 is a perspective view of a connector waterproof structure combined with a motor stator seat of a first preferred embodiment of the present invention.
Figure 2:
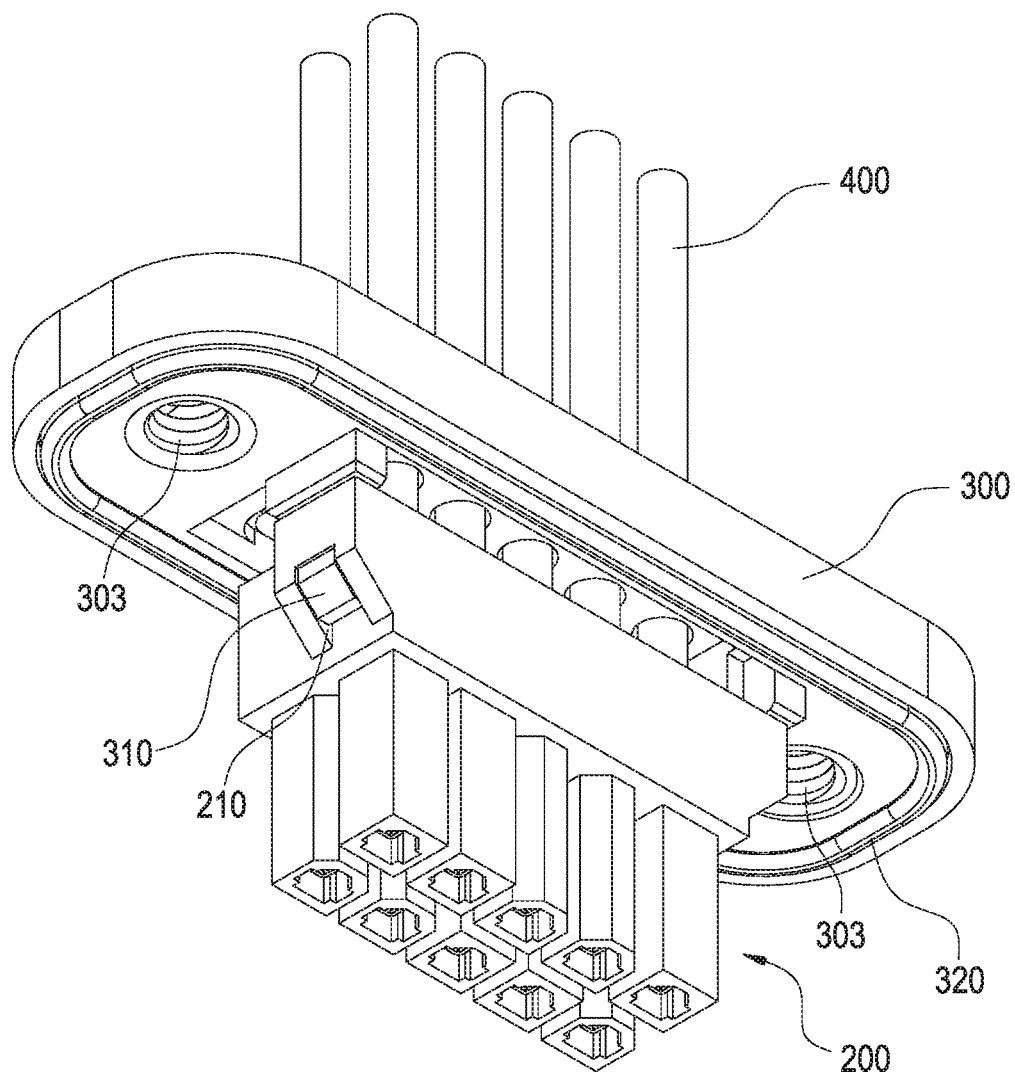
FIG. 2 is a perspective view of a connector waterproof structure of the first preferred embodiment of the present invention.
Figure 3:
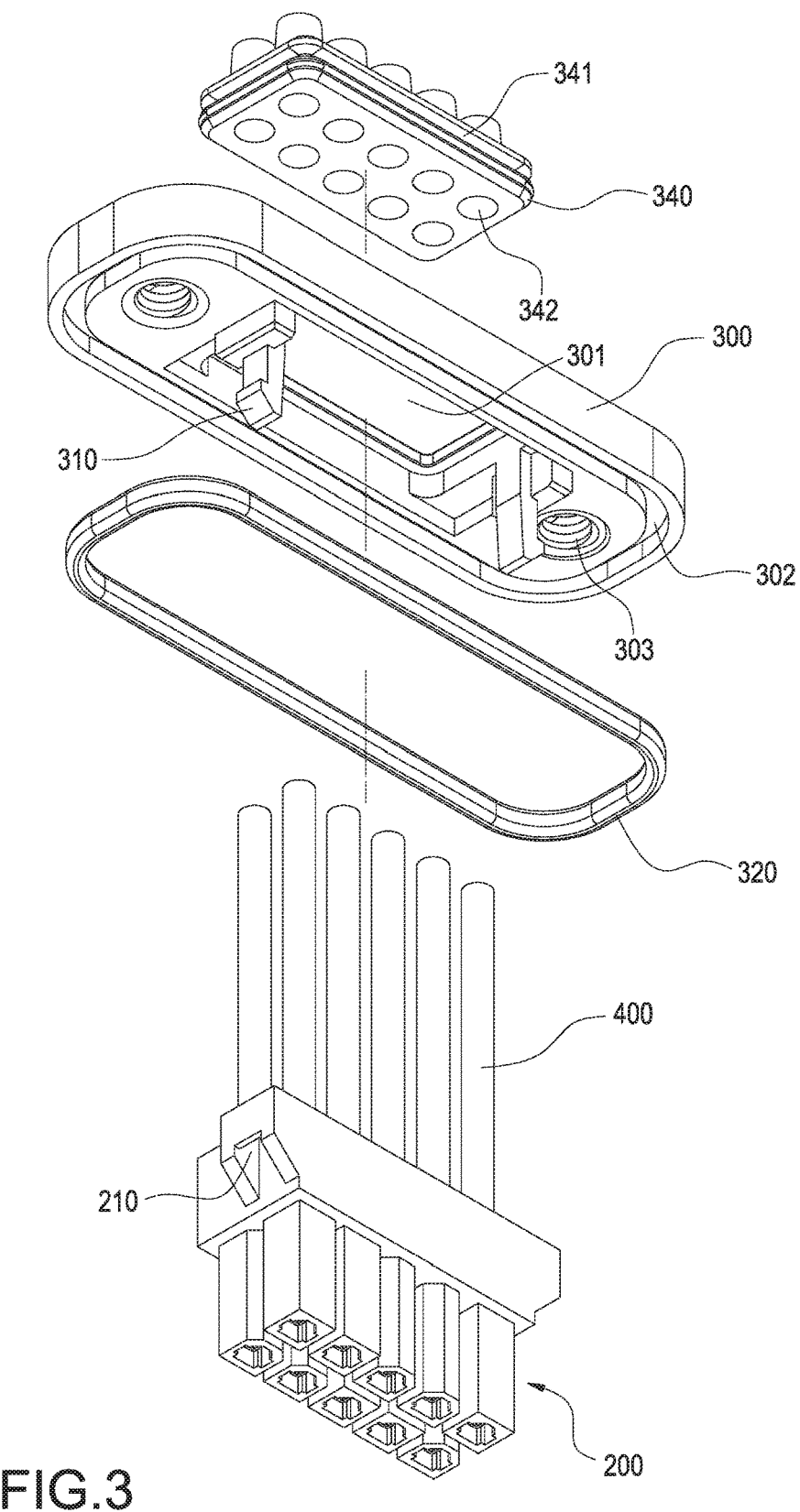
FIG. 3 is an exploded view of a connector waterproof structure of the first preferred embodiment of the present invention.
Figure 4:
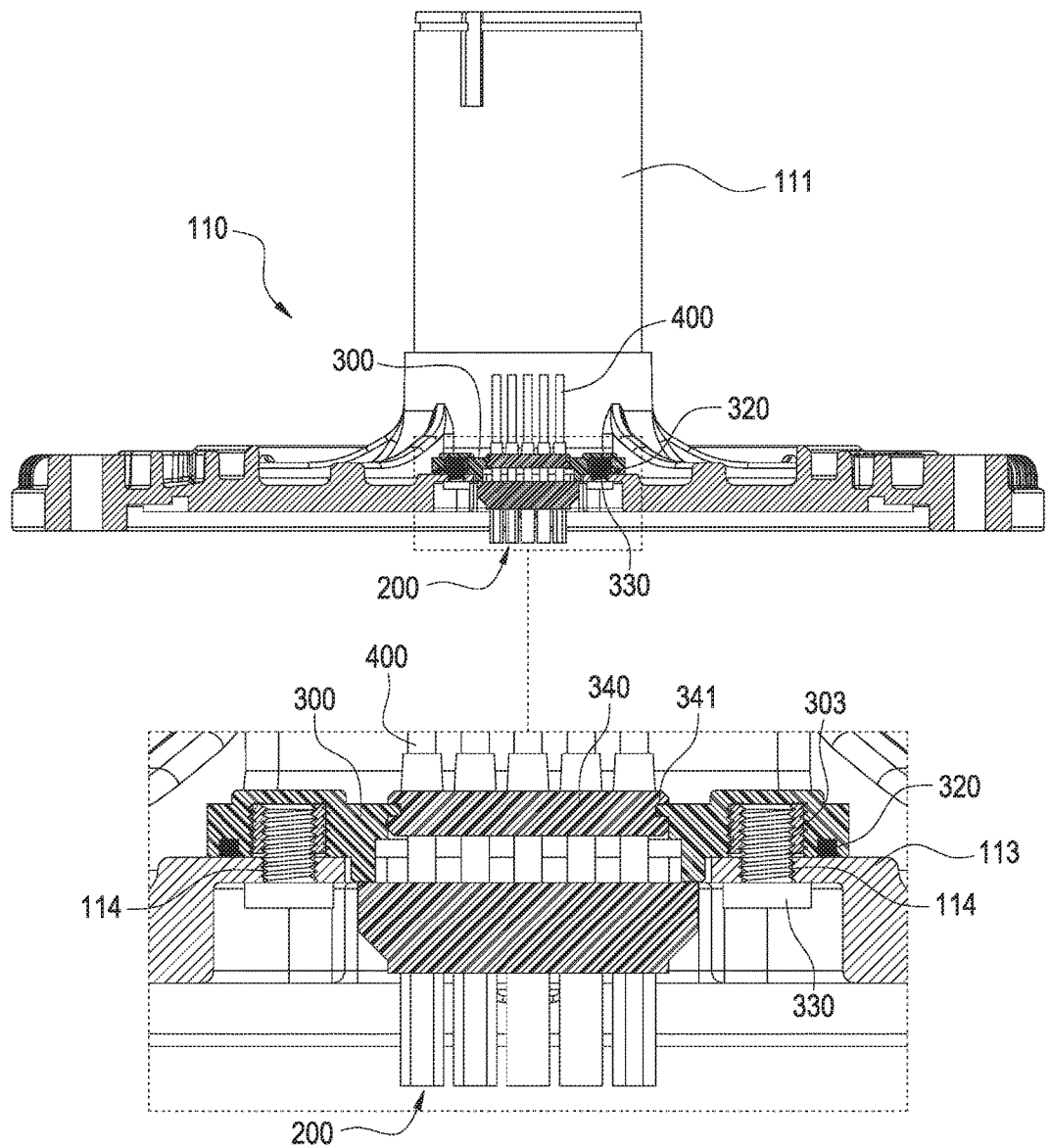
FIG. 4 is a longitudinal cross-sectional view of a connector waterproof structure combined with a motor stator seat of the first preferred embodiment of the present invention.
Figure 5:
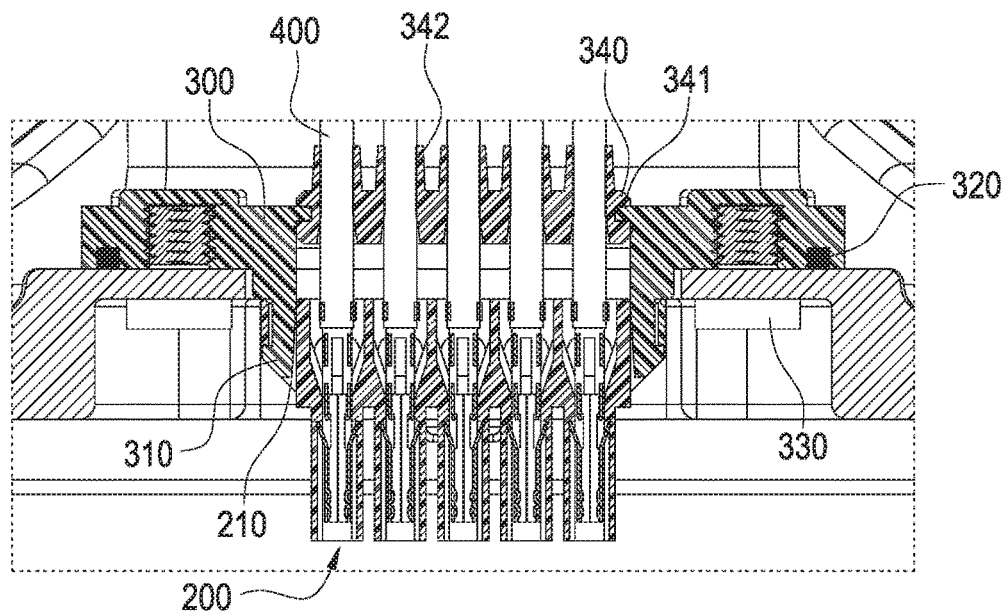
FIG. 5 is another longitudinal cross-sectional view of a connector waterproof structure combined with a motor stator seat of the first preferred embodiment of the present invention.

The technical contents of the present invention will become apparent with the detailed description of preferred embodiments accompanied with the illustration of related drawings as follows.

With reference to FIGS. 1 to 5 for a connector waterproof structure in accordance with the first preferred embodiment of the present invention, the structure is applied to a stator seat of a motor 100. In this preferred embodiment, the connector waterproof structure comprises a pillow 110, a connector 200, a waterproof element 300 and a plurality of cables 400.

In this preferred embodiment, the pillow 110 is preferably made of metal and in a circular disc shape, and a sleeve 111 is extended from a side of the pillow 110 and provided for installing a motor stator (not shown in the figure), wherein and a motor rotor is pivotally installed in the sleeve 111. A through hole 112 is formed on the aforementioned side of the pillow 110 and communicated to the other side of the pillow 110 opposite to the sleeve 111.

The connector 200 is installed at the pillow 110 and configured to be corresponsive to the through hole 112. The connector 200 forms at least one first connecting structure 210. In this preferred embodiment, the connector 200 preferably has a pair of first connecting structures 210 and each of the first connecting structures 210 is preferably a latch hole, but the present invention is not limited to such arrangements only.

The waterproof element 300 and the sleeve 111 are disposed on the same side, and the waterproof element 300 is covered onto the through hole 112. An annular groove 302 and at least one blind hole 303 are formed on a side of the waterproof element 300. In this preferred embodiment, the blind holes 303 preferably come with a pair, and the blind holes 303 are disposed within a range enclosed by the annular groove 302. The annular groove 302 has an O-ring 320 installed therein and clamped between the waterproof element 300 and the pillow 110. A level difference 113 exists at the periphery of the through hole 112 so that the O-ring 320 and the pillow 110 can be combined tightly with each other. The waterproof element 300 has a second connecting structure 310 corresponsive to each of the first connecting structures 210. In this preferred embodiment, the second connecting structure 310 is a latch corresponsive to the first connecting structure 210. The second connecting structure 310 is latched to the first connecting structure 210 through the through hole 112. The second connecting structure 310 and the first connecting structure 210 are coupled to each other so as to fix the connector 200 to the waterproof element 300. The waterproof element 300 has an insertion hole 301 penetrating through the waterproof element 300 and disposed within a range enclosed by the annular groove 302. The insertion hole 301 has a cork 340 installed therein. A circular bezel 341 is formed around the periphery of the cork 340, the internal periphery of the insertion hole 301 is embedded into the bezel 341, and the cork 340 has a plurality of waterproof holes 342 formed at position corresponsive to the cables 400 respectively.

A penetrating hole 114 is formed between the through hole 112 and the level difference 113 and penetrated through the pillow 110. The waterproof element 300 secured to the pillow 110 by a pair of bolts 330 corresponsive to the blind holes 303, respectively, is locked to each of the bolts 330 from an opposite side of the sleeve 111 and passed through the penetrating hole 114 and penetrated into the pillow 110 to secure to the blind hole 303. Therefore, the waterproof element 300 is secured to the pillow 110 to abut the O-ring 320 and achieve the waterproof effect between the waterproof element 300 and the pillow 110. The bolt 330 passes through the pillow 110 at the position where the bolt 330 is covered, and the O-ring 320 and the cork 340 achieve the waterproof effect.

Each of the cables 400 has an end coupled to the connector 200 and the other end passing through the insertion hole 301 and the through hole 112 to connect the stator. In this preferred embodiment, each of the cables 400 passes through the corresponsive waterproof hole 342 and through the cork 340, wherein the diameter of each waterproof hole 342 is not greater than that of the corresponsive cable 400 passing through such waterproof hole 342, so that the cork 340 covers at least a portion of each of the cables 400 by each of the waterproof holes 342. The waterproof element 300 and the cork 340 seal the through hole 112 and isolate the two sides of the pillow 110 to achieve the waterproof effect.

Figure 6:
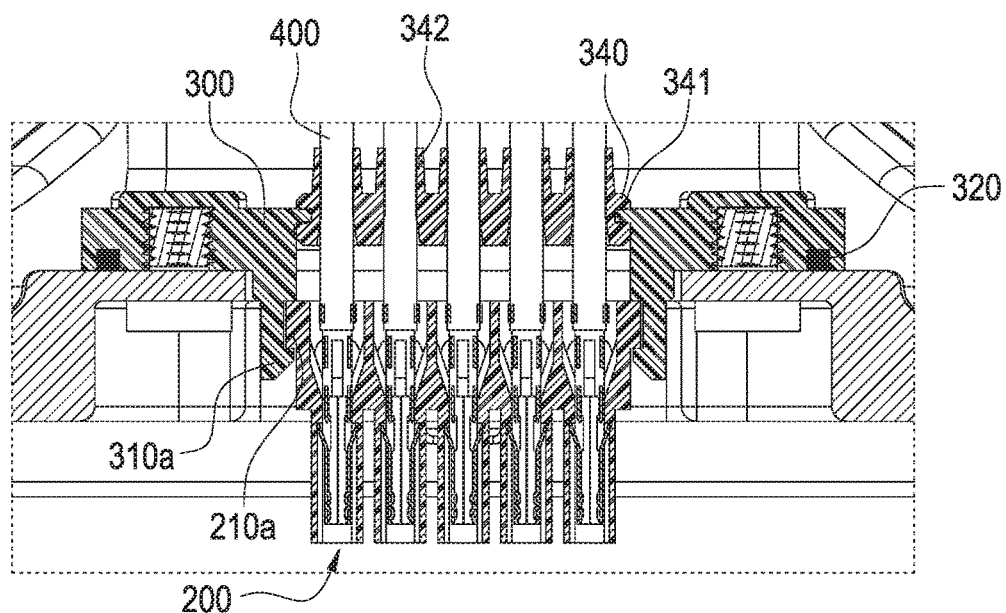
FIG. 6 is a schematic view showing a different mode of a connector waterproof structure of the first preferred embodiment of the present invention.
Figure 7:
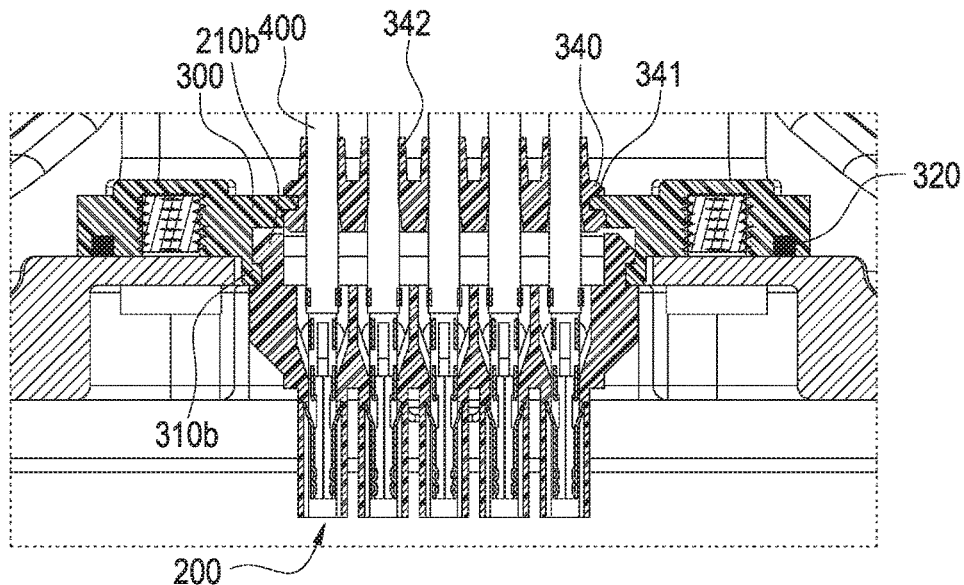
FIG. 7 is a schematic view showing another different mode of a connector waterproof structure of the first preferred embodiment of the present invention.
Figure 8:
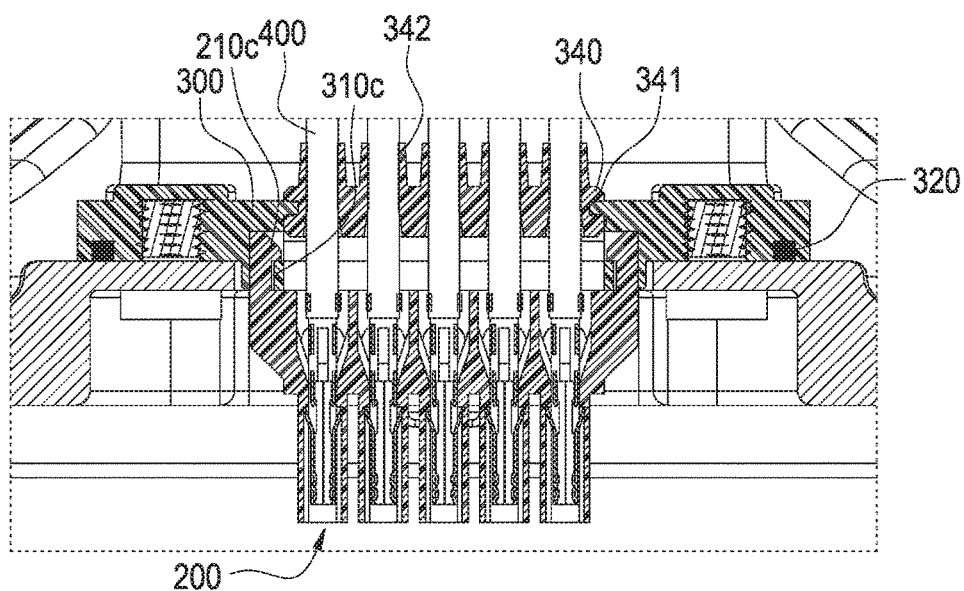
FIG. 8 is a schematic view showing a further different mode of a connector waterproof structure of the first preferred embodiment of the present invention.

However, the first and second connecting structures 210, 310 of the present invention are not limited to the aforementioned forms only. In FIG. 6, the first connecting structure 210a is a latch, and the second connecting structure 310a is a latch hole corresponsive to the first connecting structure 210a. In FIG. 7, the first connecting structure 210b is a latch, and the second connecting structure 310b is a flange formed on the connector 200 and corresponsive to the first connecting structure 210b. In FIG. 8, the first connecting structure 210c is a flange formed on the connector 200, and the second connecting structure 310c is a latch corresponsive to the first connecting structure 210c.

Figure 9:
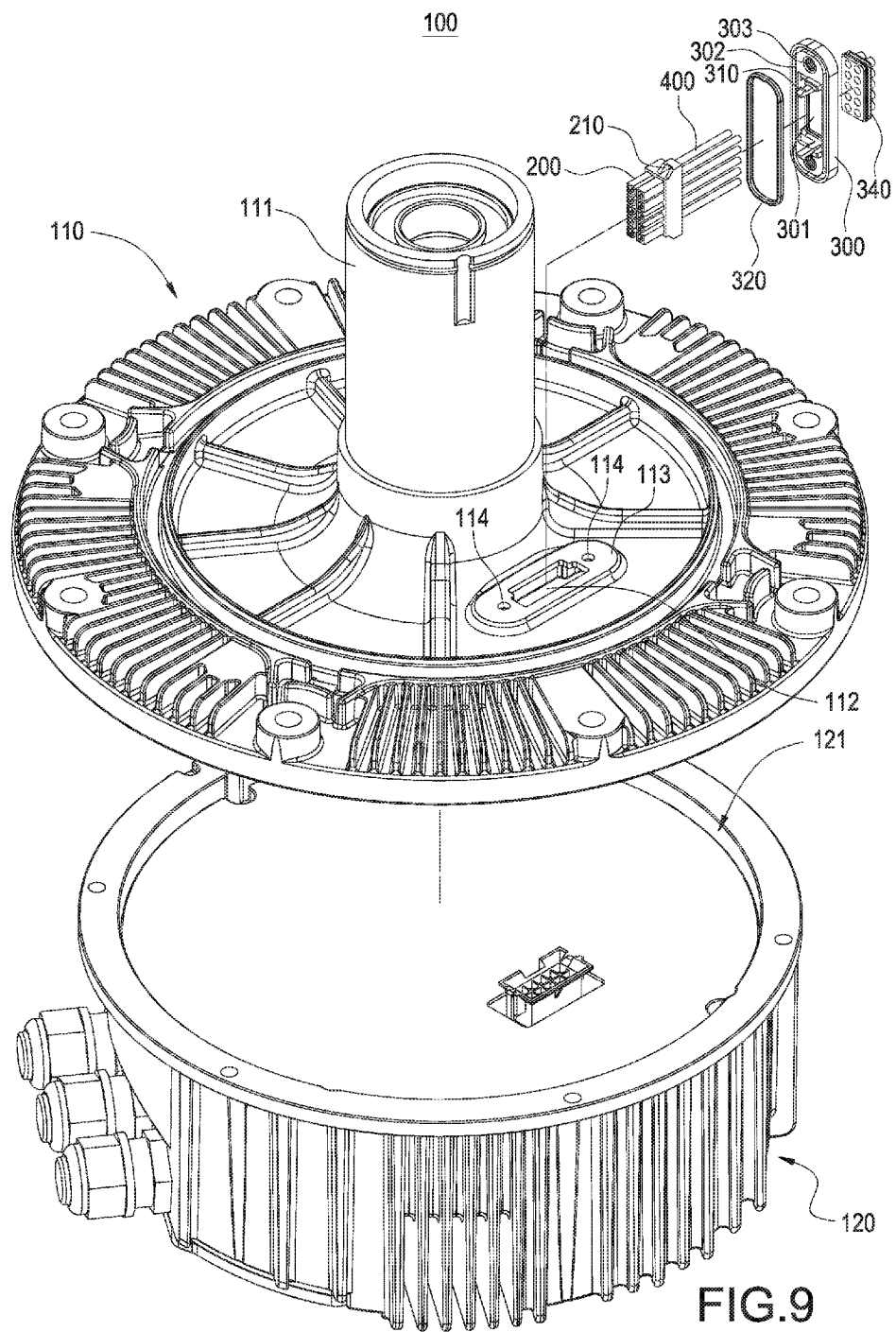
FIG. 9 is an exploded view of a stator seat of a motor combined with a motor cap of a second preferred embodiment of the present invention.
Figure 10:
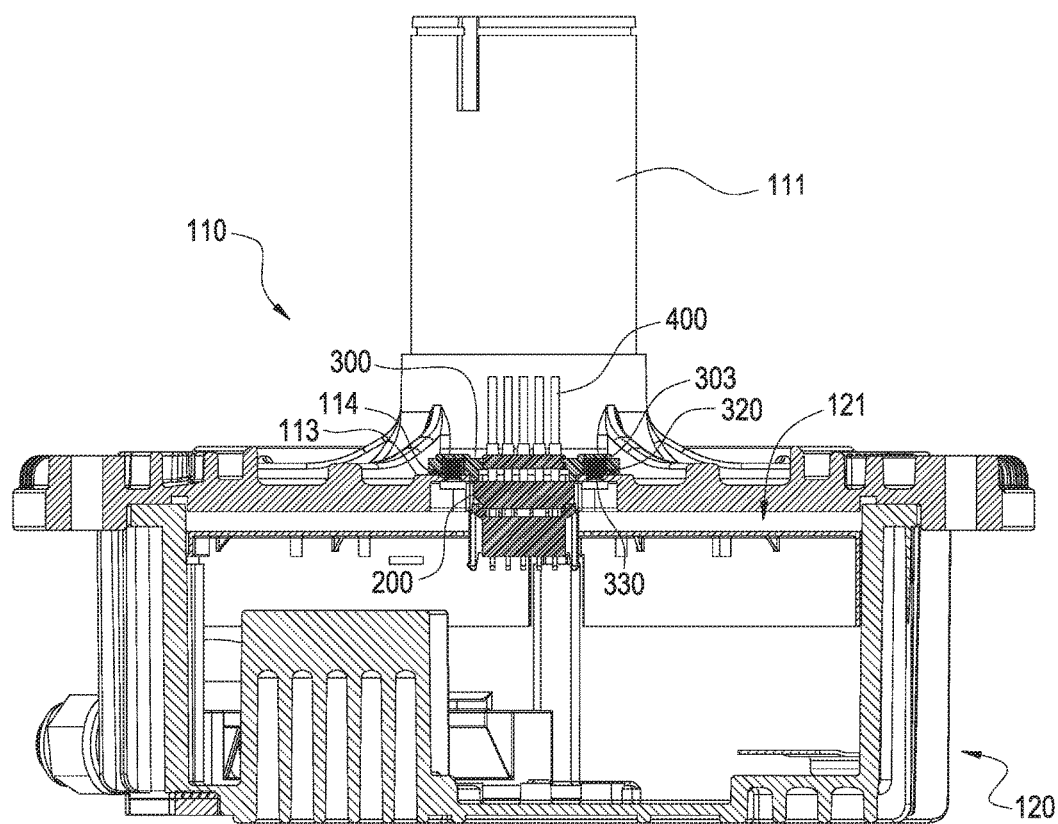
FIG. 10 is a longitudinal cross-sectional view of a stator seat of a motor combined with a motor cap of the second preferred embodiment of the present invention.
Figure 11:
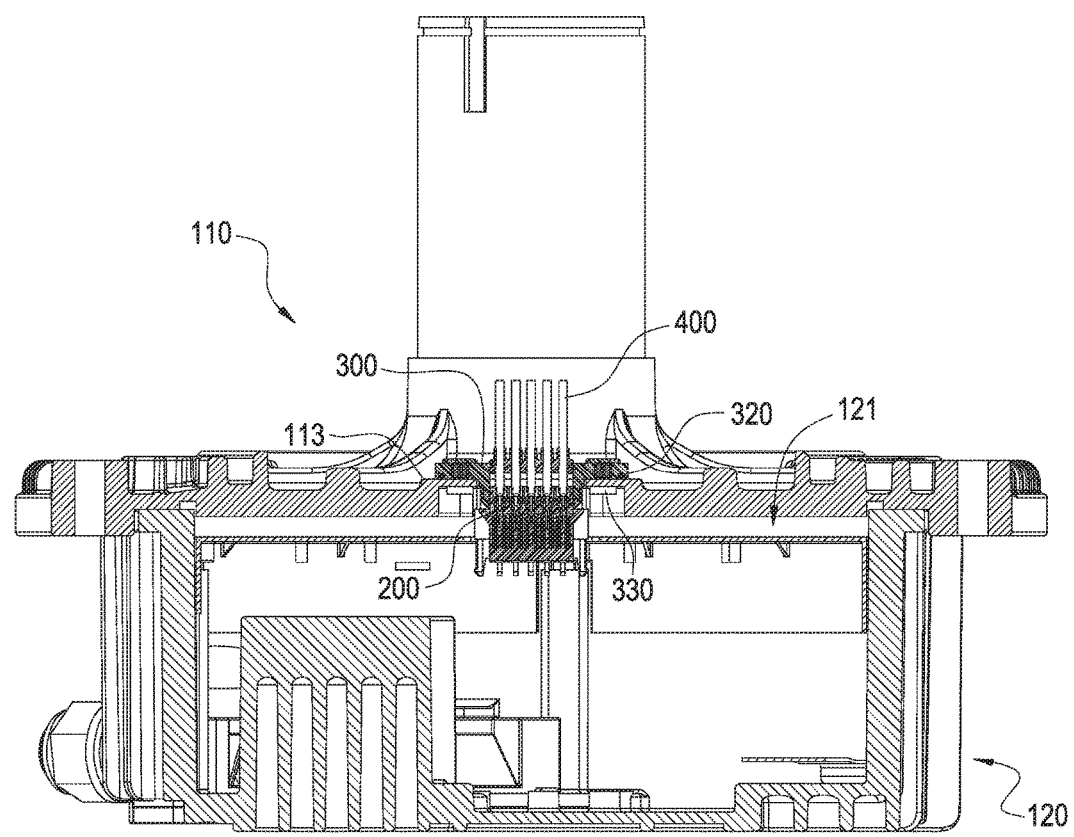
FIG. 11 is another longitudinal cross-sectional view of a stator seat of a motor combined with a motor cap of the second preferred embodiment of the present invention.

With reference to FIGS. 9 to 11 for a stator seat of a motor of a second preferred embodiment of the present invention, the stator seat comprises a pillow 110, a cap 120, a connector 200, a waterproof element 300 and a plurality of cables 400.

In this preferred embodiment, the pillow 110 is preferably made of metal and in a circular disc shape, and a sleeve 111 is extended from a side of the pillow 110 and provided for installing a motor stator (not shown in the figure), wherein and a motor rotor is pivotally installed in the sleeve 111. A cap 120 is covered onto the pillow 110, wherein the cap 120 covers the other side opposite to the sleeve 111, and a control chamber 121 is formed and enclosed by the cap 120 and the pillow 110, and the pillow 110 has a through hole 112 communicated with the control chamber 121.

The connector 200 is configured to be corresponsive to the through hole 112 and installed in the control chamber 121, and the connector 200 forms at least one first connecting structure 210. In this preferred embodiment, the connector 200 preferably has a pair of first connecting structures 210, and each first connecting structure 210 is preferably a latch hole. The first connecting structure 210 and the second connecting structure 310 of the present invention are not limited to the aforementioned forms only, but they can be of different forms as described in the first preferred embodiment, and thus will not be repeated.

The waterproof element 300 is covered onto an external side of the through hole 112, and an annular groove 302 and at least one blind hole 303 are formed on a side of the waterproof element 300. In this preferred embodiment, the blind holes 303 preferably comes with a pair, and the blind holes 303 are disposed within a range enclosed by the annular groove 302. The annular groove 302 has an O-ring 320 installed therein and clamped between the waterproof element 300 and an external surface of the pillow 110. A level difference 113 exists at the periphery of the through hole 112, so that the O-ring 320 and the pillow 110 can be combined tightly with each other. The waterproof element 300 has a second connecting structure 310 corresponsive to each respective first connecting structure 210. In this preferred embodiment, each second connecting structure 310 is a latch corresponsive to each first connecting structure 210, and the second connecting structure 310 is passed through the through hole 112 to latch the first connecting structure 210. The second connecting structure 310 and the first connecting structure 210 are connected to each other to fix the connector 200 to the waterproof element 300. In addition, an insertion hole 301 is formed and penetrated through the waterproof element 300, and the insertion hole 301 is disposed within a range enclosed by the annular groove 302, and a cork 340 is installed in the insertion hole 301. A circular bezel 341 is formed around the periphery of the cork 340, the internal periphery of the insertion hole 301 is embedded into the bezel 341, and the cork 340 has a plurality of waterproof holes 342 corresponsive to the cables 400 respectively.

A penetrating hole 114 is formed between the through hole 112 and the level difference 113 and penetrated through the pillow 110. The waterproof element 300 is secured to the pillow 110 by a pair of bolts 330 corresponsive to the blind holes 303 respectively, wherein each of the bolts 330 is passed from the opposite side of the sleeve 111 through the penetrating hole 114 and penetrated into the pillow 110 and secured to the blind hole 303. The waterproof element 300 is secured to the pillow 110 to abut the O-ring 320, so as to achieve the waterproof effect between the waterproof element 300 and the pillow 110. The pillow 110 is covered by the waterproof element 300 at the position where a bolt 330 is passed, and the O-ring 320 and the cork 340 are provided for achieving the waterproof effect.

Each of the cables 400 has an end coupled to the connector 200 and the other end passed through the insertion hole 301 and the through hole 112 to connect the stator. In this preferred embodiment, each of the cables 400 is passed through the respective waterproof hole 342 and penetrated through the cork 340, wherein the diameter of each waterproof hole 342 is not greater than that of each corresponsive cable 400, so that the cork 340 can cover at least a portion of each of the cables 400 through each of the waterproof holes 342. The waterproof element 300 and the cork 340 seal the through hole 112 and isolate the two sides of the pillow 110 to provide a waterproof effect to the interior of the control chamber 121.

In a stator seat of a motor 100 and a waterproof structure of its connector 200 in accordance with the present invention, the waterproof element 300 is provided to achieve the waterproof effect between the connector 200 and the through hole 112 formed on the stator seat 100, so that moisture is blocked and prevented from entering into the control chamber 121 of the stator seat 100.

In summation of the description above, the present invention is novel, useful and inventive and complies with the patent application requirements and thus is duly filed for patent application. While the invention has been described by means of specific embodiments, numerous modifications and variations could be made thereto by those skilled in the art without departing from the scope and spirit of the invention set forth in the claims.

What is claimed is:

1. A stator seat of a motor, comprising:
 a pillow, having a sleeve extended from an external surface of the pillow, a cap covered on an opposite side of the sleeve, and a control chamber formed by being enclosed by the cap and the pillow, and the pillow having a through hole formed thereon and communicated with the control chamber;
 a connector, installed in the control chamber and configured to be corresponsive to the through hole, and including a first connecting structure;
 a waterproof element, covered onto an external side of the through hole, and comprising a second connecting structure coupled to the first connecting structure trough the through hole and the pillow being thereby clamped between the connector and the waterproof element to seal respective sides of the through hole, and the waterproof element having an insertion hole formed thereon and penetrating through the waterproof element; and
 a plurality of cables, each having an end coupled to the connector, and the other end passing through the insertion hole and the through hole and out from the pillow,
 wherein
  a sleeve is extended from a side of the pillow and provided from installing a motor stator,
  the waterproof element has a blind hole formed thereon, and
  a penetrating hole is formed penetrated through the pillow for fixing the waterproof element with the pillow from the control chamber therethrough.

2. The stator seat of a motor as claimed in claim 1, wherein the first connecting structure is a latch, and the second connecting structure is a latch hole corresponsive to the first connecting structure.

3. The stator seat of a motor as claimed in claim 1, wherein the second connecting structure is a latch, and the first connecting structure is a latch hole corresponsive to the second connecting structure.

4. The stator seat of a motor as claimed in claim 1, further comprising a bolt passing out of the pillow from the control chamber to secure the waterproof element.

5. The stator seat of a motor as claimed in claim 1, wherein the sleeve is formed on a side of the pillow.

6. The stator seat of a motor as claimed in claim 5, wherein the through hole is formed on the pillow.

7. The stator seat of a motor as claimed in claim 5, further comprising a bolt passing out of the pillow from the control chamber to secure the waterproof element.

8. The stator seat of a motor as claimed in claim 7, wherein the bolt is secured to the blind hole.

9. The stator seat of a motor as claimed in claim 8, wherein the blind hole is disposed within a range enclosed by an annular groove.

10. The stator seat of a motor as claimed in claim 1, wherein the insertion hole has a cork disposed therein and covering at least one portion of each cable.

11. The stator seat of a motor as claimed in claim 1, wherein the insertion hole is disposed within a range enclosed by an annular groove.

12. A connector waterproof structure, applied to a stator seat of a motor, comprising:
 a pillow, having a sleeve extended from an external surface of the pillow, a cap covered on an opposite side of the sleeve, and a control chamber formed by being enclosed by the cap and the pillow, and the pillow having a through hole formed thereon and communicated with the control chamber;

a connector, installed in the control chamber and configured to be corresponsive to the through hole, and including a first connecting structure;

a waterproof element, covered onto an external side of the through hole, and comprising a second connecting structure coupled to the first connecting structure through the through hole and the pillow being thereby clamped between the connector and the waterproof element to seal respective sides of the through hole, and the waterproof element having an insertion hole formed thereon and penetrating through the waterproof element; and a plurality of cables, each having an end coupled to the connector, and the other end passing through the insertion hole and the through hole and out from the pillow, wherein a sleeve is extended from a side of the pillow and provided from installing a motor stator, the waterproof element has a blind hole formed thereon, and a penetrating hole is formed penetrated through the pillow for fixing the waterproof element with the pillow from the control chamber therethrough.

13. The connector waterproof structure as claimed in claim 12, wherein the first connecting structure is a latch, and the second connecting structure is a latch hole corresponsive to the first connecting structure.

14. The connector waterproof structure as claimed in claim 12, wherein the second connecting structure is a latch, and the first connecting structure is a latch hole corresponsive to the second connecting structure.

15. The connector waterproof structure as claimed in claim 12, further comprising a bolt passing out of the pillow from the control chamber to secure the waterproof element.

16. The connector waterproof structure as claimed in claim 15, wherein the bolt is secured to the blind hole.

17. The connector waterproof structure as claimed in claim 16, wherein the blind hole is disposed within a range enclosed by an annular groove.

18. The connector waterproof structure as claimed in claim 12, wherein the insertion hole includes a cork installed therein and covering at least one portion of each cable.

19. The connector waterproof structure as claimed in claim 12, wherein the insertion hole is disposed within a range enclosed by an annular groove.

* * * * *